(12) United States Patent  
Chang et al.

(10) Patent No.: US 10,989,573 B2  
(45) Date of Patent: Apr. 27, 2021

(54) METHOD AND DEVICE FOR CORRECTING ANGLE SENSOR

(71) Applicant: PEGATRON CORPORATION, Taipei (TW)

(72) Inventors: Tien-Chu Chang, Taipei (TW); Nien-Chih Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/793,864

(22) Filed: Feb. 18, 2020

(65) Prior Publication Data

US 2020/0292362 A1   Sep. 17, 2020

(30) Foreign Application Priority Data

Mar. 15, 2019   (TW) .................................. 108108766

(51) Int. Cl.
  *G01D 18/00*   (2006.01)
  *G01D 5/16*   (2006.01)

(52) U.S. Cl.
  CPC ............. *G01D 18/00* (2013.01); *G01D 5/16* (2013.01)

(58) Field of Classification Search
  CPC ........... G01D 5/16; G01D 3/022; G01D 5/165
  See application file for complete search history.

(56) References Cited

U.S. PATENT DOCUMENTS

| 2003/0193306 | A1* | 10/2003 | Griffitts | H02P 6/18 318/459 |
|---|---|---|---|---|
| 2017/0163186 | A1* | 6/2017 | Marini | H02P 1/022 |
| 2018/0009468 | A1* | 1/2018 | Fujita | B60R 16/033 |
| 2018/0331641 | A1* | 11/2018 | Ishikawa | H02P 6/153 |

FOREIGN PATENT DOCUMENTS

| CN | 203011370 | 6/2013 |
|---|---|---|
| JP | 2001178193 | 6/2001 |
| JP | 2008064660 | 3/2008 |
| TW | 200804113 | 1/2008 |
| TW | 201349714 | 12/2013 |

* cited by examiner

Primary Examiner — Alvaro E Fortich
(74) Attorney, Agent, or Firm — J.C. Patents

(57) ABSTRACT

A method for correcting an angle sensor is applied to a step motor including an angle sensor, where the angle sensor rotates with the step motor, and the method for correcting an angle sensor includes the following steps: rotating the step motor by a preset angle to a first position; reading a first voltage of the angle sensor when the angle sensor is rotated to the first position; determining whether the first voltage deviates from a preset voltage curve; if yes, recording a first offset of the first voltage relative to the preset voltage curve; and compensating for a sensing angle of the angle sensor according to the first offset. A device for correcting an angle sensor is further provided.

10 Claims, 5 Drawing Sheets

METHOD AND DEVICE FOR CORRECTING ANGLE SENSOR

CROSS-REFERENCE TO RELATED APPLICATION

This application claims the priority benefit of Taiwan application serial no. 108108766, filed on Mar. 15, 2019. The entirety of the above-mentioned patent application is hereby incorporated by reference herein and made a part of this specification.

BACKGROUND

Technical Field

This disclosure relates to a method and a device for correcting a sensor, and in particular, to a method for correcting an angle sensor and a device for correcting an angle sensor.

Related Art

A step motor generates intermittent power through magnetic pole conversion, to move with high precision. A general step motor adopts open-loop control, but there is no feedback mechanism to perform monitoring. Consequently, it is impossible to determine whether the motor has a lost step. In addition, an encoder may be add to some step motors to control movement accuracy, but only an end point error of whether the motor has reached an end point of an action is detected.

To avoid a shift caused by an abnormal step motor, a current solution is to dispose an angle sensor on a rotating shaft of the step motor to detect an actual rotation angle of the step motor. However, such a sensor is prone to wear and tear after a long period of use, leading to a gradual deviation of the angle detected by the sensor from an ideal curve, further resulting in a decrease in the accuracy of correcting the step motor.

SUMMARY

This disclosure provides a method and a device for correcting an angle sensor, to easily correct an angle sensor.

A method for correcting an angle sensor in this disclosure is applied to a step motor including an angle sensor, where the angle sensor rotates with the step motor, and the method for correcting an angle sensor includes the following steps: rotating the step motor by a preset angle to a first position; reading a first voltage of the angle sensor when the angle sensor is rotated to the first position; determining whether the first voltage deviates from a preset voltage curve; if yes, recording a first offset of the first voltage relative to the preset voltage curve; and compensating for a sensing angle of the angle sensor according to the first offset.

A device for correcting an angle sensor in this disclosure includes a step motor, an angle sensor, and a controller. The angle sensor is disposed at the step motor to rotate with the step motor. The controller is coupled to the step motor and the angle sensor, and is configured to: control the step motor to rotate by a preset angle to a first position with the angle sensor; read a first voltage of the angle sensor when the angle sensor is rotated to the first position; determine whether the first voltage deviates from a preset voltage curve; if yes, record a first offset of the first voltage relative to the preset voltage curve; and compensate for a sensing angle of the angle sensor according to the first offset.

Based on the foregoing description, in embodiments of this disclosure, the step motor is used to correct the sensing angle of the angle sensor that is used to monitor the step motor. In this way, the method and the device for correcting an angle sensor provided in the embodiments of this disclosure can correct the angle sensor disposed at the step motor without adding extra devices. Therefore, the embodiments of this disclosure can effectively extend the service life of the angle sensor and ensure the operation and sensing accuracy of the device, and even reduce the maintenance cost of the device.

To make the foregoing features and advantages of this disclosure more obvious and understandable, the following embodiments are cited and described in detail with reference to the accompanying drawings.

DETAILED DESCRIPTION

The foregoing and other technical contents, features, and functions of this disclosure are clearly presented in the following detailed description of each embodiment in conjunction with the reference drawings. The directional terms mentioned in the following embodiments, such as "up", "down", "before", "after", "left", "right", and the like, are only directions that refer to the accompanying drawings. Therefore, directional terms are used to describe, rather than to limit this disclosure. In addition, in each of the following embodiments, identical or similar elements will have identical or similar labels.

Figure 1:
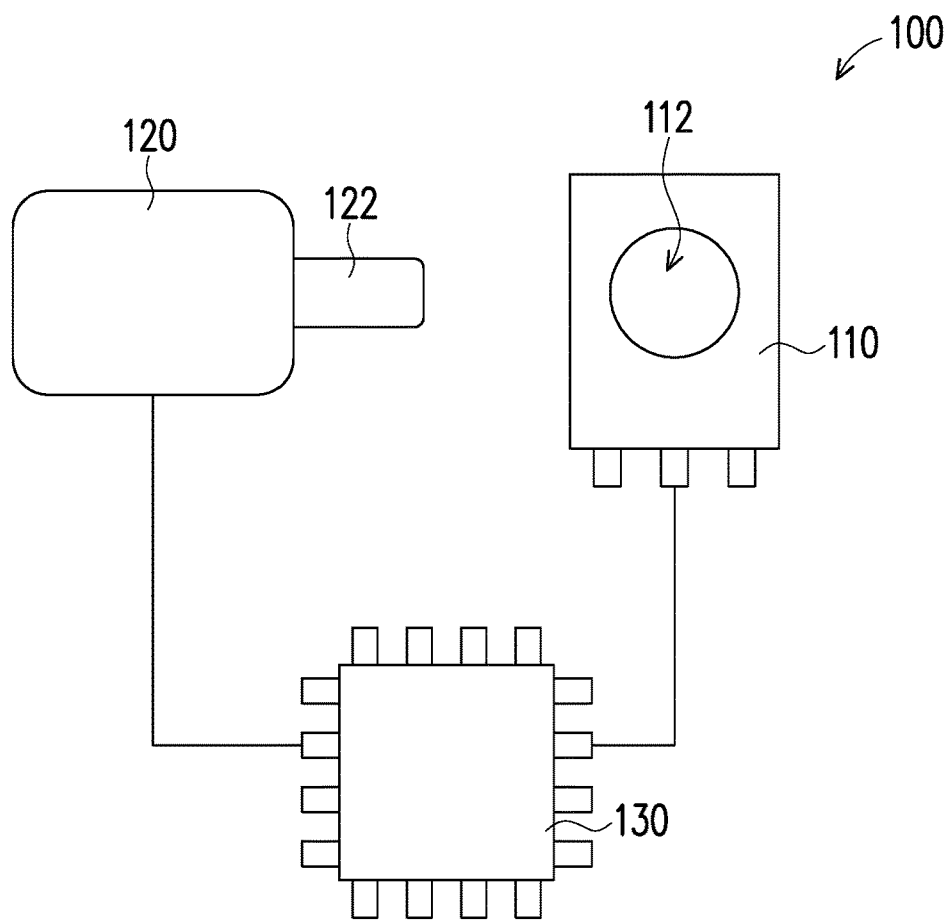
FIG. 1 is a schematic block diagram of a device for correcting an angle sensor according to an embodiment of this disclosure.
Figure 2:
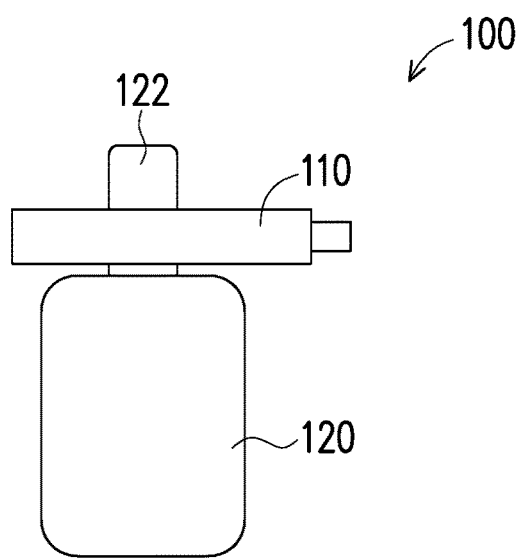
FIG. 2 is a schematic side view of a device for correcting an angle sensor according to an embodiment of this disclosure.

FIG. 1 is a schematic block diagram of a device for correcting an angle sensor according to an embodiment of this disclosure. FIG. 2 is a schematic side view of a device for correcting an angle sensor according to an embodiment of this disclosure. Referring to FIG. 1 and FIG. 2 at the same time, in this embodiment, a device for correcting an angle sensor 100 may include an angle sensor 110, a step motor 120, and a controller 130. In some embodiments, the angle sensor 110 may include a contact angle sensor and a non-contact angle sensor, where the contact angle sensor may be a resistive angle sensor, whose basic principle is to output a change in a rotation angle as a change in resistance. Furthermore, the resistive angle sensor can use, for example, rotating wipers to change the resistance value, resulting in a change in output voltage. In this embodiment, the angle sensor 110 can be the resistive angle sensor. Definitely, this disclosure is not limited thereto. In other embodiments, the angle sensor 110 can be the non-contact angle sensor, for example, a rotational variable difference transformer (RVDT), or an angle encoder.

In some embodiments, the step motor 120 can be a direct-current brushless motor that may include a stator and a rotor that are, for example, gear-like protrusions (small gears) and are meshed with each other, and the rotor may gradually rotate by a certain angle by switching a current flowing to a coil of the stator. In some embodiments, the angle sensor 110 can be disposed at the step motor 120 as shown in FIG. 2 to detect and monitor the rotation angle of the step motor 120. In some embodiments, the controller 130 can be a microcontroller coupled to the step motor 120 and the angle sensor 110 to control the step motor 120 and the angle sensor 110.

Figure 3:
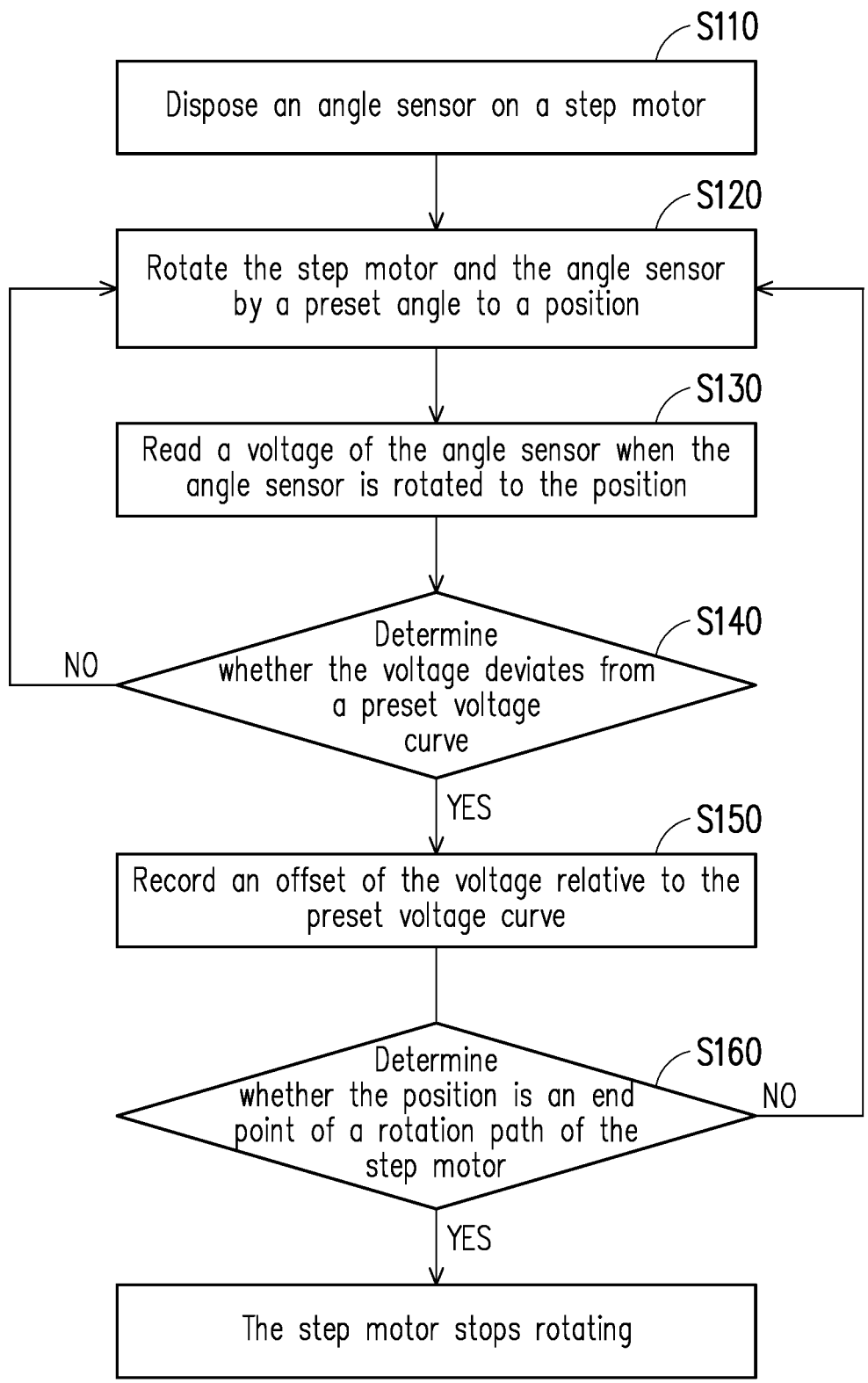
FIG. 3 is a schematic flowchart of a method for correcting an angle sensor according to an embodiment of this disclosure.

FIG. 3 is a schematic flowchart of a method for correcting an angle sensor according to an embodiment of this disclosure. Referring to FIG. 1 to FIG. 3 at the same time, in some embodiments, the method for correcting an angle sensor which can be applied to the foregoing device for correcting an angle sensor 100 may include the following steps. First, step S110 is performed to dispose the angle sensor 110 on the step motor 120. In this embodiment, the angle sensor 110 can be sleeved on the step motor 120 as shown in FIG. 2. For example, the angle sensor 110 can include an assembly hole 112 as shown in FIG. 1. In this way, the angle sensor 110 can be sleeved on a rotating shaft 122 of the step motor 120 by using the assembly hole 112 to rotate with the step motor 120, so that the angle sensor 110 can detect and monitor the rotation angle of the step motor 120. In some other embodiments, the angle sensor 110 can be integrated into the step motor 120, and can be of an integrally formed structure. In other words, the method for correcting an angle sensor may not include step S110.

Figure 4:
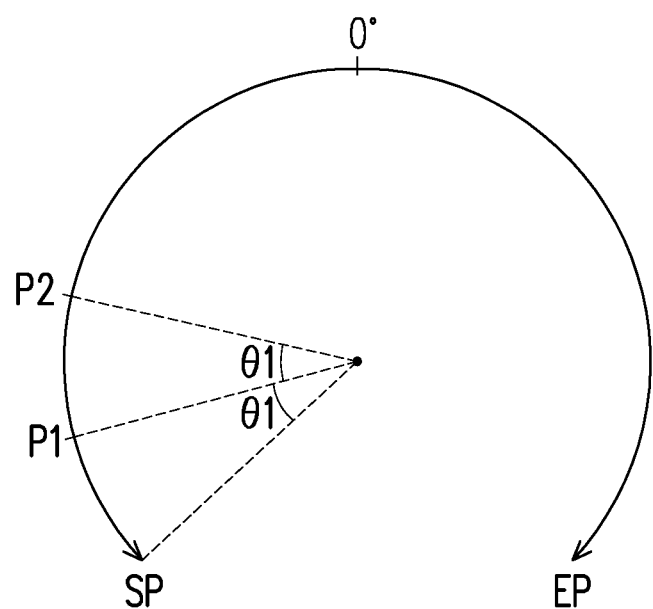
FIG. 4 is a schematic diagram of a rotation path of a step motor according to an embodiment of this disclosure.

FIG. 4 is a schematic diagram of a rotation path of a step motor according to an embodiment of this disclosure. Referring to FIG. 3 and FIG. 4 at the same time, then, step S120 is performed. In step S120, the controller 130 controls the step motor 120 and the angle sensor 110 which is sleeved on the step motor 120 to rotate by a preset angle θ1 from a start position SP to a (first) position P1. In this embodiment, the preset angle θ1 is a step unit of each rotation of the step motor 120, such as 10 degrees. Definitely, this embodiment is only used as an example for description and is not limited thereto.

Figure 5:
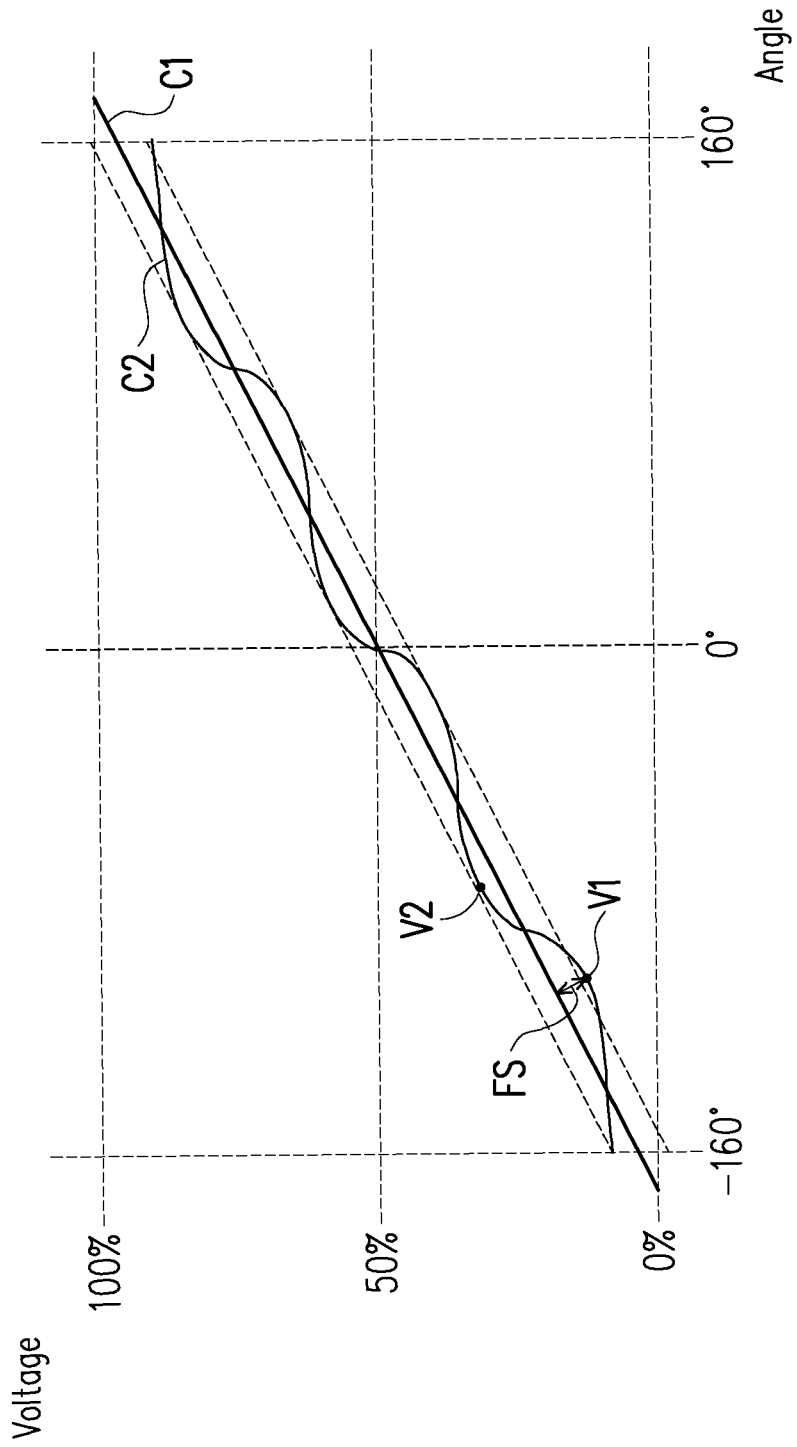
FIG. 5 is a schematic diagram of a relationship between a sensing voltage curve and a preset voltage curve according to an embodiment of this disclosure.

FIG. 5 is a schematic diagram of a relationship between a sensing voltage curve and a preset voltage curve according to an embodiment of this disclosure. Referring to FIG. 3 to FIG. 5 at the same time, then, step S130 is performed to read a (first) voltage V1 of the angle sensor 110 when the angle sensor 110 is rotated to the (first) position P1. That is, the controller 130 reads the voltage V1 of the angle sensor 110 in response to the rotating the angle sensor 110 to the position P1. In this embodiment, the voltage V1 is an output voltage that is output when the angle sensor 110 is rotated to the position P1.

Referring to FIG. 3 to FIG. 5, then, step S140 is performed. In step S140, the controller 130 determines whether the (first) voltage V1 deviates from a preset voltage curve C1. In this embodiment, the preset voltage curve C1 is a curve of an ideal relationship curve of the rotation angle of the angle sensor 110 in an ideal state (no error) and the corresponding output voltage. That is, if the rotation angle of the angle sensor 110 is known, the corresponding ideal output voltage can be obtained on the preset voltage curve C1. Therefore, by comparing the first voltage V1 with the ideal output voltage on the preset voltage curve C1, whether the first voltage V1 deviates from the preset voltage curve C1 can be known. According to the embodiment in FIG. 5, the first voltage V1 has deviated from the preset voltage curve C1. Definitely, relationships between values and between curves in FIG. 5 are both schematic, and this disclosure is not limited thereto.

Referring to FIG. 3 to FIG. 5, then, if the controller 130 determines that the first voltage V1 has deviated from the preset voltage curve C1, step S150 is performed to record an (first) offset FS of the first voltage V1 relative to the preset voltage curve C1. In this embodiment, a method for determining whether the first voltage V1 deviates from the preset voltage curve C1 can include: determining whether a difference between the first voltage V1 and the preset voltage curve C1 is greater than a preset value; if yes, determining that the first voltage V1 does deviate from the preset voltage curve C1; and recording the first offset FS of the first voltage V1 relative to the preset voltage curve C1. In this embodiment, the preset value may be ±2% of the preset voltage curve C1, for example, two dashed lines parallel to the preset voltage curve C1 in FIG. 5, but this embodiment is not limited thereto. If the offset FS of the first voltage V1 is greater than the preset value (tolerance value), it indicates that the offset of the first voltage V1 is excessively large, and the controller 130 records the offset FS.

Referring to FIG. 3 to FIG. 5 at the same time, then, step S160 is performed. In step S160, the controller 130 determines whether the position P1 is an end point EP of the rotation path of the step motor 120, and if yes, it indicates that the entire correction of the rotation path has been completed; and the controller 130 can stop rotating the step motor 120. In this case, voltage offsets of positions in the entire rotation path have been obtained by the controller 130, to serve as a reference for compensation and correction of a sensing angle detected by the angle sensor 110 in the future. In this embodiment, the controller 130 can draw an actual output voltage curve C2 shown in FIG. 5 based on the obtained voltage offsets at each position, and the output voltage curve C2 is compared with the preset voltage curve C1 and used as the basis for compensation and correction of the sensing angle detected by the angle sensor 110 in the future.

In this way, when the rotation angle of the step motor 120 is detected and monitored by the angle sensor 110, the controller 130 can compensate for the sensing angle of the angle sensor 110 according to the previously recorded offset (for example, the first offset FS). For example, after completing the steps of the foregoing correction method, the controller 130 has learned that the first voltage V1 output when the angle sensor 110 (and the step motor 120) is rotated to the first position P1 has the first offset FS. Therefore, the controller 130 can compensate for, based on the offset FS, the sensing angle sensed when the angle sensor 110 (and the step motor 120) is rotated to the first position P1 (for example, the sensed sensing angle plus or minus the angle corresponding to the first offset FS).

In some embodiments, if the controller 130 determines that the first position P1 is not the end point EP of the rotation path of the step motor 120, that is, the step motor 120 has not rotated to the end point EP of the rotation path of the step motor 120, step S120 to step S160 can be repeatedly performed until the step motor 120 is rotated to the end point EP of the rotation path of the step motor 120.

Specifically, if the controller 130 determines that the first position P1 is not the end point EP of the rotation path of the step motor 120, the controller 130 can continue to control the step motor 120 and the angle sensor 110 to rotate from the (first) position P1 by the preset angle θ1 to a (second) position P2 as shown in FIG. 4. Then, a (second) voltage V2 of the angle sensor 110 is read when the angle sensor 110 is rotated to the (second) position P2. In this embodiment, the voltage V2 is an output voltage of the angle sensor 110 when the angle sensor 110 is rotated to the position P2.

Then, the controller 130 determines whether the voltage V2 deviates from the preset voltage curve C1. In this way, by comparing the voltage V2 with the ideal output voltage on the preset voltage curve C1, whether the voltage V2 deviates from the preset voltage curve C1 can be known.

Then, if the controller 130 determines that the voltage V2 does deviate from the preset voltage curve C1, an (second) offset of the voltage V2 relative to the preset voltage curve C1 is recorded. As shown in FIG. 5, a difference between the voltage V2 and the preset voltage curve C1 is less than the preset value (the voltage V2 does not exceed a range between the two dashed lines shown in FIG. 5). Therefore, an offset of the voltage V2 can be regarded as a tolerance range, and the controller 130 may not record the second offset, and can continue to control the step motor 120 and the angle sensor 110 to rotate from the second position P2 by the preset angle θ1 to a third position, to repeatedly perform step S120 to step S160 until the step motor 120 is rotated to the end point EP of the rotation path of the step motor 120.

Figure 6:
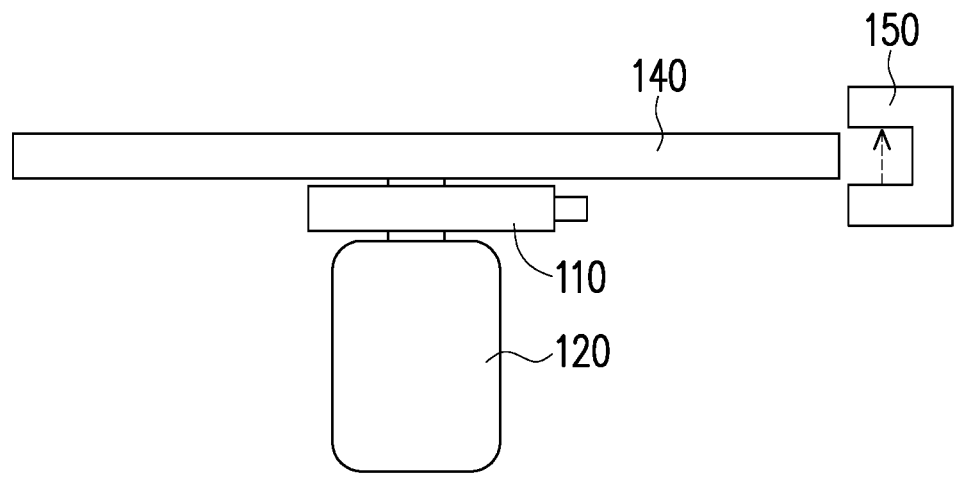
FIG. 6 is a schematic side view of a device for correcting an angle sensor according to an embodiment of this disclosure.
Figure 7:
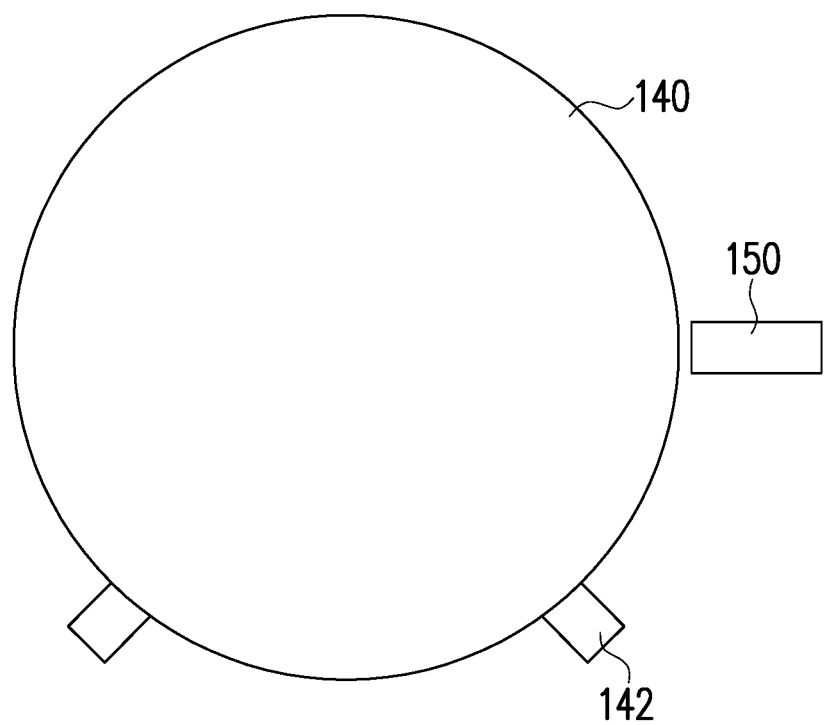
FIG. 7 is a schematic top view of a device for correcting an angle sensor according to an embodiment of this disclosure.

FIG. 6 is a schematic side view of a device for correcting an angle sensor according to an embodiment of this disclosure. FIG. 7 is a schematic top view of a device for correcting an angle sensor according to an embodiment of this disclosure. In some embodiments, the device for correcting an angle sensor 100 can determine, in various manners, whether the step motor 120 is rotated to the end point of the rotation path of the step motor 120 (for example, the end point EP of the rotation path shown in FIG. 4), and one of these manners is described as an example below.

Referring to FIG. 6 and FIG. 7 at the same time, in some embodiments, the device for correcting an angle sensor 100 may further include a sensing switch 150 disposed at the rotation path of the step motor 120. In some embodiments, the controller 130 can be coupled to the sensing switch 150 to determine whether the step motor 120 is rotated to the end point of the rotation path of the step motor 120. For example, the sensing switch 150 can be a non-contact sensing switch such as a photo interrupter, or a contact sensing switch such as a microswitch. In this configuration, when the step motor 120 is rotated to a disposition position of the sensing switch 150, the sensing switch 150 can be triggered, and then a sensing signal is generated. Therefore, the controller 130 can determine, based on the sensing signal, whether the step motor 120 is rotated to the end point of the rotation path of the step motor 120.

In some embodiments, the device for correcting an angle sensor can further include a mechanical part 140 disposed at the step motor 120 to rotate with the step motor 120. In this embodiment, the mechanical part 140 can be disposed at a rotating shaft of the step motor 120 (the rotating shaft 122 shown in FIG. 2), and the angle sensor 110 can be disposed between the step motor 120 and the mechanical part 140. Accordingly, the sensing switch 150 can be disposed at the rotation path of the mechanical part 140 to trigger the sensing switch 150 when the mechanical part 140 rotates to the disposition position of the sensing switch 150 with the step motor 120. For example, the mechanical part 140 can include a protruding part 142. In this configuration, when the protruding part 142 rotates to the disposition position of the sensing switch 150, the protruding part 142 can trigger the sensing switch 150 by, for example, masking a light ray (for example, an infrared ray) emitted by the photo interrupter or contacting the microswitch, and then a sensing signal is generated, Therefore, the controller 130 determines, according to the sensing signal, that the step motor 120 is rotated to the end point of the rotation path of the step motor 120. Definitely, this embodiment is only used as an example for description, and this disclosure is not limited thereto.

In conclusion, in the embodiments of this disclosure, the step motor is used to correct the sensing angle of the angle sensor that is used to monitor the step motor. In this way, the method and the device for correcting an angle sensor provided in the embodiments of this disclosure can correct the angle sensor disposed at the step motor without adding extra devices. Therefore, the embodiments of this disclosure can effectively extend the service life of the angle sensor and ensure the operation and sensing accuracy of the device, and even reduce the maintenance cost of the device.

Although this disclosure is disclosed above through the embodiments, the embodiments are not intended to limit this disclosure. A person of ordinary skill in the art may make some changes and modifications within the spirit and scope of this disclosure, so that the protection scope of this disclosure shall be subject to the scope of the attached claims.

What is claimed is:

1. A method for correcting an angle sensor, applied to a step motor comprising the angle sensor, wherein the angle sensor rotates with the step motor, and the method comprising:
   rotating the step motor by a preset angle to a first position;
   reading a first voltage of the angle sensor when the angle sensor is rotated to the first position;
   determining whether the first voltage deviates from a preset voltage curve;
   if yes, recording a first offset of the first voltage relative to the preset voltage curve; and
   compensating for a sensing angle of the angle sensor according to the first offset.

2. The method for correcting an angle sensor according to claim 1, wherein the step of determining whether the voltage deviates from the preset voltage curve comprises:
   determining whether a difference between the first voltage and the preset voltage curve is greater than a preset value.

3. The method for correcting an angle sensor according to claim 2, wherein the step of recording the first offset of the first voltage relative to the preset voltage curve comprises:
   recording the difference as the first offset.

4. The method for correcting an angle sensor according to claim 1, further comprising:
   determining whether the first position is an end point of a rotation path of the step motor; and
   if yes, stopping rotating the step motor.

5. The method for correcting an angle sensor according to claim 1, further comprising:
   rotating the step motor by the preset angle from the first position to a second position;
   reading a second voltage of the angle sensor when the angle sensor is rotated to the second position;
   determining whether the second voltage deviates from the preset voltage curve; and
   if yes, recording a second offset of the second voltage relative to the preset voltage curve.

6. A device for correcting an angle sensor, comprising:
a step motor;
an angle sensor, disposed at the step motor to rotate with the step motor; and
a controller, coupled to the step motor and the angle sensor, and configured to:
control the step motor to rotate by a preset angle to a first position;
read a first voltage of the angle sensor when the angle sensor is rotated to the first position;
determining whether the first voltage deviates from a preset voltage curve;
if yes, record a first offset of the first voltage relative to the preset voltage curve; and
compensate for a sensing angle of the angle sensor according to the first offset.

7. The device for correcting an angle sensor according to claim 6, wherein the angle sensor comprises a resistive angle sensor.

8. The device for correcting an angle sensor according to claim 6, further comprising:
a sensing switch, disposed at a rotation path of the step motor, wherein the controller is coupled to the sensing switch to determine whether the step motor is rotated to an end point of the rotation path.

9. The device for correcting an angle sensor according to claim 8, wherein the sensing switch comprises a photo interrupter or a microswitch.

10. The device for correcting an angle sensor according to claim 8, further comprising a mechanical part, disposed at the step motor to rotate with the step motor, wherein the sensing switch is disposed at a rotation path of the mechanical part.

* * * * *